US011426700B2

(12) United States Patent
Odaka et al.

(10) Patent No.: US 11,426,700 B2
(45) Date of Patent: Aug. 30, 2022

(54) GAS SEPARATION MEMBRANE MANUFACTURING METHOD

(71) Applicant: NISSAN CHEMICAL CORPORATION, Tokyo (JP)

(72) Inventors: Kazutoshi Odaka, Funabashi (JP); Tadayuki Isaji, Funabashi (JP); Yuji Horiuchi, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/053,516

(22) PCT Filed: May 15, 2019

(86) PCT No.: PCT/JP2019/019386
§ 371 (c)(1),
(2) Date: Nov. 6, 2020

(87) PCT Pub. No.: WO2019/221200
PCT Pub. Date: Nov. 21, 2019

(65) Prior Publication Data
US 2021/0236996 A1   Aug. 5, 2021

(30) Foreign Application Priority Data

May 16, 2018   (JP) .............................. JP2018-094902

(51) Int. Cl.
*B01D 53/22*   (2006.01)
*B01D 67/00*   (2006.01)
(Continued)

(52) U.S. Cl.
CPC ....... *B01D 67/0009* (2013.01); *B01D 53/228* (2013.01); *B01D 71/027* (2013.01);
(Continued)

(58) Field of Classification Search
CPC ............. B01D 67/0009; B01D 53/228; B01D 71/027; B01D 71/38; B01D 71/76; B01D 2325/02
See application file for complete search history.

(56) References Cited

U.S. PATENT DOCUMENTS 3,749,604 A * 7/1973 Langer ................. H01M 50/411
429/136
2005/0142163 A1* 6/2005 Hunter ...................... A61P 1/00
424/423
(Continued)

FOREIGN PATENT DOCUMENTS

CN   104722215 A   6/2015
JP   2007-99607 A   4/2007
(Continued)

OTHER PUBLICATIONS

Takahashi et al.; "Gas permeation in poly(ether imide) nanocomposite membranes based on surface-treated silica. Part 2: With chemical coupling to matrix;" Polymer; 2006; pp. 7535-7547; vol. 47.
(Continued)

*Primary Examiner* — Anthony R Shumate
(74) *Attorney, Agent, or Firm* — Oliff PLC

(57) ABSTRACT

A method for producing a gas separation membrane containing fine particles uniformly dispersed in a resin, including the following (A) and (B): (A) a step of mixing the fine particles with a matrix resin, the amount of the fine particles with respect to the entire mass of the mixture being adjusted to 1 mass % to 50 mass %, to thereby prepare a master batch; and (B) a step including dissolving the master batch in a solvent, applying the prepared solution onto a substrate, and evaporating the solvent.

8 Claims, 3 Drawing Sheets

Example 1

(51) Int. Cl.
*B01D 71/02* (2006.01)
*B01D 71/38* (2006.01)
*B01D 71/76* (2006.01)

(52) U.S. Cl.
CPC ............. *B01D 71/38* (2013.01); *B01D 71/76* (2013.01); *B01D 2325/02* (2013.01)

(56) References Cited

U.S. PATENT DOCUMENTS

| | | | |
|---|---|---|---|
| 2005/0175703 A1* | 8/2005 | Hunter | A61L 27/54 424/486 |
| 2010/0190965 A1* | 7/2010 | Yamaguchi | B01D 63/02 530/388.1 |
| 2010/0247669 A1* | 9/2010 | Eliasof | A61K 31/337 424/501 |
| 2013/0202659 A1* | 8/2013 | Crawford | A61K 47/593 424/400 |
| 2015/0056399 A1* | 2/2015 | Takeoka | B01D 67/009 428/64.1 |
| 2015/0086801 A1* | 3/2015 | Hiraki | B01J 20/12 428/500 |
| 2019/0060838 A1* | 2/2019 | Hiranabe | B01J 20/06 |
| 2019/0184345 A1* | 6/2019 | Kawakami | B01D 71/64 |
| 2019/0246591 A1* | 8/2019 | Leo | A01K 67/033 |
| 2019/0358913 A1* | 11/2019 | Haverhals | D06M 23/10 |
| 2020/0109070 A1* | 4/2020 | Hashimoto | C02F 1/447 |

FOREIGN PATENT DOCUMENTS

| | | |
|---|---|---|
| JP | 2010-292228 A | 10/2010 |
| JP | 2014-14807 A | 1/2014 |
| WO | 2017/056594 A1 | 4/2017 |
| WO | 2018/038027 A1 | 3/2018 |

OTHER PUBLICATIONS

Aug. 13, 2019 Search Report issued in International Patent Application No. PCT/JP2019/019386.

Jan. 5, 2022 Extended European Search Report issued in European Patent Application No. 19803701.2.

Beltran et al., "Organosilane modified silica/polydimethylsiloxane mixed matrix membranes for enhanced propylene nitrogen separation," Applied Surface Science, vol. 258, No. 1, Aug. 16, 2011, pp. 337-345.

Ahn et al., "Gas transport behavior of mixed-matrix membranes composed of silica nanoparticles in a polymer of intrinsic microporosity," Journal of Membrane Science, vol. 346, No. 2, Sep. 30, 2009, pp. 280-287.

Khoonsap et al., "Improving water selectivity of poly(vinyl alcohol) (PVA)—Fumed silica (FS) nanocomposite membranes by grafting of poly (2-hydroxyethyl methacrylate) (PHEMA)) on fumed silica particles," Chemical Engineering Science, vol. 122, Oct. 5, 2014, pp. 373-383.

* cited by examiner

Example 1

Example 2

Example 3

Example 11

Example 15

GAS SEPARATION MEMBRANE MANUFACTURING METHOD

TECHNICAL FIELD

The present invention relates to a method for producing a gas separation membrane containing fine particles uniformly dispersed in a resin, the method achieving uniform dispersion of fine particles which per se are difficult to disperse in the resin, without performing addition of a polymer to the particle surface, alteration of the solvent for varnish, or addition of a dispersant.

BACKGROUND ART

In recent years, studies on fine particles (nanoparticles) having a particle size on the order of nanometers (i.e., a mean particle size of 1 nm to several hundreds of nanometers) have been actively conducted as part of nanotechnology research. Unlike the case of a conventional bulk material, nanoparticles (i.e., nanosized material) are known to exhibit and impart various functions and characteristics, and thus are expected to have applications in a wide range of industrial fields. Although nanoparticles can be produced in the form of primary particles, they have strong aggregation property attributed to their fineness and, when left to stand, form aggregates having a particle size on the order of micrometers. For example, in the case where inorganic nanoparticles as described above are added to an organic component, thermal resistance and mechanical strength will be improved, but the inorganic nanoparticles, which have strong aggregation property, may form aggregates on the order of micrometers in an organic solvent or a polymer matrix. Consequently, the resultant organic-inorganic composite material may fail to exhibit expected properties and performance. Thus, uniform chemical modification of the surfaces of nanoparticles has been proposed for maintaining their primary particle dispersibility (see, for example, Patent 1). However, even when the chemical modification approach is employed, sufficient dispersibility cannot be attained.

Meanwhile, attention has been paid to an organic-inorganic composite material that is prepared by mixing an inorganic component and an organic component at a nanometric or molecular level and can synergistically enhance the advantages of both the components. This concept has been applied to polymer gas separation membranes whose utility has received attention for solving energy and environmental problems. Thus, demand has arisen for preparation of an organic-inorganic composite material through addition of inorganic nanoparticles to a polymer matrix to achieve high mechanical strength, thermal stability, and gas permeability, which cannot be attained by conventional techniques.

A gas separation method employing the gas permeability of a polymer membrane can achieve gas separation and recovery without causing a phase change of gas. The gas separation method involves a simpler operation than another gas separation technique, can employ a small-sized apparatus, and enables continuous gas separation. Thus, the gas separation method is advantageous in terms of low environmental load. Such an energy-saving method using a polymer gas separation membrane has recently received particular attention as a technique for separation and recovery of greenhouse gases, preparation of oxygen-enriched air, or purification of natural gas. Although such a method is expected to be used in practice, the method needs further improvements in gas separation performance and gas permeability.

As described above, attempts have been made to improve the gas permeability of a polymer membrane by incorporation of inorganic nanoparticles into the membrane. The aforementioned aggregation of nanoparticles also causes problems in preparation of an organic-inorganic composite gas separation membrane. Specifically, an existing organic-inorganic composite gas separation membrane exhibits low membrane strength and fails to achieve high particle content, which are caused by aggregation of inorganic nanoparticles in a polymer matrix. Thus, such a gas separation membrane has a problem in that an increase in gas permeability is at most a factor of several times.

Under such circumstances, there has been reported, for example, a method for improving the gas separation membrane performance of a polymer membrane by incorporation of inorganic nanoparticles into the membrane, the method involving treatment of the surfaces of silica nanoparticles with an amino group-containing silane coupling agent to thereby silylate the particle surface, treatment of the surface-silylated particles with a polymer to thereby prepare polymer-grafted silica particles, and dispersion of the polymer-grafted silica particles into a polymer, to thereby form a resin membrane. The resin membrane was examined for its performance as a gas separation membrane (see Non-Patent 1). However, the results of the examination demonstrate that the membrane exhibits, for example, unsatisfactory gas permeability.

In order to solve such a problem, there has been proposed a gas separation membrane exhibiting considerably improved gas permeability and containing inorganic nanoparticles that do not aggregate in an organic solvent or a polymer matrix and exhibit excellent uniform dispersibility, wherein the nanoparticles are prepared by bonding of a bulky hyperbranched polymer or dendrimer to the surfaces of silica nanoparticles (see Patent 2). However, dispersibility of the thus-modified silica particles in resin and gas permeability of the formed membrane are unsatisfactorily improved.

PRIOR ARTS

Patent Documents
Patent 1: Japanese Patent Application Laid-Open (kokai) No. 2007-99607
Patent 2: Japanese Patent Application Laid-Open (kokai) No. 2010-222228
Non-Patents
Non-Patent 1: Polymer, 47 (2006), pp. 7535-7547

SUMMARY OF THE INVENTION

Problems to be Solved by the Invention

As mentioned above, difficulty is generally encountered in dispersing inorganic nanoparticles (i.e., particles having a small particle size and assuming micropowder) in resin. Particularly when good solvent for the resin is different from good solvent for the nanoparticles, high-level dispersion of the particles in the resin cannot be easily attained. Furthermore, when dispersion of fine particles in resin is insufficient, the performance of the formed gas separation membrane is considerably impaired. Specifically, the produced gas separation membrane exhibits nano-cracking, warpage, or breaking. As a result, the composite membrane is weakened.

Meanwhile, one technique for improving dispersibility of fine particles is optimization of a surface modification group. However, a sufficient effect fails to be attained in the case of combination with a certain resin, and selection of the applicable resin is limited. In another case, the dispersibility may be improved through addition of a surfactant or the like. However, bleeding out of the dispersant, a drop in gas permeation performance of the gas permeating membrane, or the like occurs, which is not preferred.

Under such circumstances, an object of the present invention is to provide a method for producing a gas separation membrane (hereinafter may be referred to as a "gas separation membrane production method"), the method including incorporating inorganic nanoparticles into a polymer membrane in a uniformly dispersed state, to thereby enhance gas separation membrane performance.

Means for Solving the Problem

In order to attain the above object, the present inventors carried out studies, and have found a gas separation membrane production method involving addition of silica nanoparticles to a master batch of a specific polymer compound and using the master batch, to thereby produce a gas separation membrane exhibiting remarkably improved dispersibility of silica nanoparticles in the membrane, membrane formability, etc. The present invention has been accomplished on the basis of this finding. More specifically, the finding resides in that fine particles (in particular, silica nanoparticles) are favorably dispersed in a specific polymer compound (in particular, PIM-1, dimethylsilicone, or poly (vinyl alcohol)), and such a high dispersion state is maintained, thereby accomplishing the present invention.

Accordingly, the present invention is directed to the following.

(1) A method for producing a gas separation membrane containing fine particles uniformly dispersed in a resin, the method comprising the following (A) and (B):

(A) a step of mixing the fine particles with a matrix resin, the amount of the fine particles with respect to the entire mass of the mixture being adjusted to 1 mass % to 50 mass %, to thereby prepare a master batch; and (B) a step including dissolving the master batch in a solvent, applying the prepared solution onto a substrate, and evaporating the solvent.

(2) A gas separation membrane production method as described in (1), wherein the matrix resin is a microporous polymer.

(3) A gas separation membrane production method as described in (2), wherein the microporous polymer is a polymer (PIM-1) represented by the following structure:

[F1]

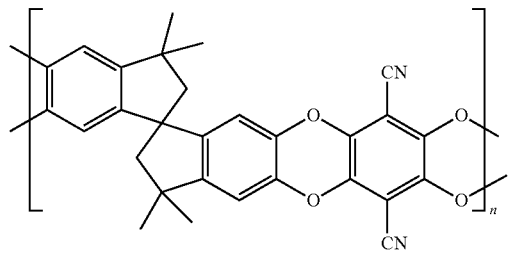

(4) A gas separation membrane production method as described in (1), wherein the matrix resin is dimethylsilicone.

(5) A gas separation membrane production method as described in (1), wherein the matrix resin is poly(vinyl alcohol).

(6) A gas separation membrane production method as described in any of (1) to (5), wherein the fine particles are inorganic fine particles.

(7) A gas separation membrane production method as described in any of (1) to (6), wherein the fine particles are silica fine particles.

(8) A gas separation membrane production method as described in any of (1) to (7), wherein the silica fine particles are silica fine particles modified with a functional group.

Effects of the Invention

According to the present invention, fine particles can be incorporated into a polymer membrane in a uniformly dispersed state. Thus, a high-performance gas separation membrane can be provided with excellent membrane formability.

MODES FOR CARRYING OUT THE INVENTION

Figure 1:
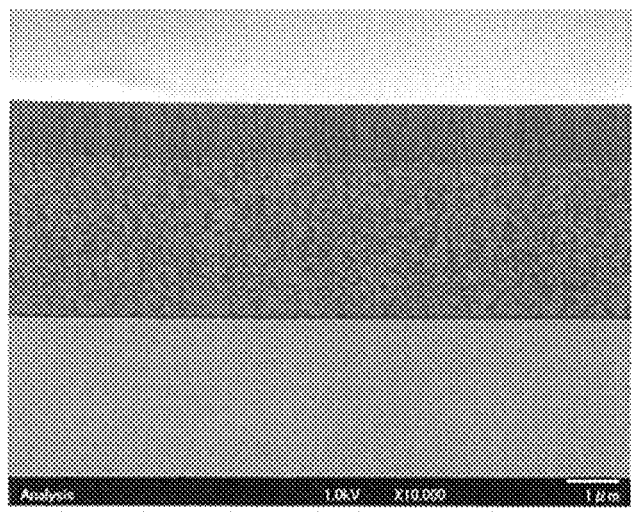
FIG. 1 An SEM image of a cross-section of a membrane according to Example 1.

The present invention will next be described in detail. The fine particles used in the present invention are nanoparticles having a nano-order mean particle size. No particular limitation is imposed on the material of the fine particles, but inorganic nanoparticles are preferred. Notably, the term "nanoparticles" refers to particles having a mean primary particle size of 1 nm to 1,000 nm, particularly 2 nm to 500 nm. The mean primary particle size is determined through the nitrogen adsorption method (BET method).

Examples of the material of the inorganic fine particles include silica, zirconia, ceria, and metal oxides. Among them, silica nanoparticles are preferred, with surface-modified silica nanoparticles being more preferred.

As silica nanoparticles, there may be employed spherical nanoparticles or irregularly shaped silica nanoparticles such as elongated shape silica nanoparticles, beaded shape silica nanoparticles, and confeito-like (or rock candy-like) shape silica nanoparticles, to thereby provide a gas separation membrane having considerably improved gas permeability. As irregularly shaped silica nanoparticles, those disclosed in WO 2018-038027 may be used. Examples of such irregularly shaped silica nanoparticles include (1) elongated shape silica nanoparticles, which have a ratio D1/D2 of 4, wherein D1 is a particle size determined through a dynamic light scattering method, and D2 is a particle size determined through the nitrogen gas adsorption method; which has a D1 of 40 to 500 nm; and which have a uniform thickness of 5 to 40 nm as observed under a transmission electron microscope; (2) beaded shape silica nanoparticles which are formed of colloidal silica spherical particles having a particle size D2 determined through the nitrogen gas adsorption method of 10 to 80 nm, and silica which binds together the colloidal silica spherical particles; which have a ratio D1/D2 of 3, wherein D1 is a particle size determined through the dynamic light scattering method, and D2 is a particle size of the colloidal silica spherical particles determined through the nitrogen gas adsorption method; which have a D1 of 40 to 500 nm; and which are formed of the colloidal silica spherical particles connected together; and (3) confeito-like shape silica nanoparticles which have a mean surface roughness S2/S3 of 1.2 to 10, wherein S2 is a specific surface area determined through the nitrogen gas adsorption method, and S3 is a specific surface area obtained by reducing a mean particle size D3 determined through image analysis; which have a D3 of 10 to 60 nm; and which have a plurality of wart-shaped projections on the surfaces thereof.

Notably, irregularly shaped silica nanoparticles are more preferably surface-modified, irregularly shaped silica nanoparticles.

The surface-modified silica preferably has a surface onto which a functional group has been introduced. The functional group-introduced surface-modified silica may be formed by treating a silane compound having a hydrophilic group with silica under heating conditions. Examples of the silane compound having a hydrophilic group include aminopropyltriethoxysilane (APTES).

Examples of the surface-modified silica nanoparticles include silica nanoparticles having a surface to which a dendrimer or a hyperbranched polymer has been added. Next, the dendrimer- or hyperbranched polymer-added surface modified silica nanoparticles will be described in detail, with an example of production method therefor.

In the production of the dendrimer- or hyperbranched polymer-added surface modified silica, firstly, silica particles are dispersed in a first solvent and treated with a reactive functional group-containing compound having a functional group that reacts with a hyperbranch-forming monomer or a dendrimer-forming monomer. Through this treatment, the reactive functional group is added to the silica surface, whereby reactive functional group-modified silica nanoparticles are yielded. A preferred reactive functional group-containing compound is a silane coupling agent, for example, an amino group-terminated compound represented by formula (1):

[F2]

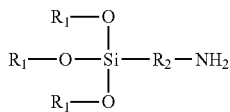

(1)

(wherein $R_1$ represents a methyl group or an ethyl group, $R_2$ represents a C1 to C5 alkylene group, an amido group, or an aminoalkylene group).

In the silane coupling agent represented by formula (1), the amino group is preferably bound to the end of the compound. However, the amino group may be bound to another position.

Examples of typical compounds represented by formula (1) include 3-aminopropyltriethoxysilane and 3-aminopropyltrimethoxysilane. Examples of the amino group-containing silane coupling agent include 3-ureidopropyltrimethoxysilane, 3-ureidopropyltriethoxysilane, 3-(2-aminoethylamino)propyltriethoxysilane, and 3-(2-aminoethylamino) propyltrimethoxysilane.

The reactive functional group-containing compound may have another group other than an amino group. Examples of such groups include an isocyanato group, a mercapto group, a glycidyl group, a ureido group, and a halogen group.

Examples of the silane coupling agent having a functional group other than an amino group include 3-isocyanatopropyltriethoxysilane, 3-mercaptopropylmethyldimethoxysilane, 3-mercaptopropyltrimethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-ureidopropyltriethoxysilane, and 3-chloropropyltrimethoxysilane.

The reactive functional group-containing compound used in the present invention is not necessarily a trialkoxysilane compound represented by formula (1). For example, the reactive functional group-containing compound may be a dialkoxysilane compound or a monoalkoxysilane compound.

The functional group of the reactive functional group-containing compound which group reacts with the silanol group of silica nanoparticles may be a group other than an alkoxy group, for example, an isocyanato group, a mercapto group, a glycidyl group, a ureido group, or a halogen atom.

In the treatment of silica nanoparticles with the reactive functional group-containing compound, the silica nanoparticles are dispersed in water or a C1 to C4 alcohol, and the reactive functional group-containing compound is added to the dispersion. The mixture is stirred.

As described above, chemical addition of reactive functional groups onto the surfaces of the silica nanoparticles may be carried out via a single-step reaction or, if required, a 2 or more-step reaction. A specific example of the 2-step reaction will be described in the preparation of carboxyl group-modified silica nanoparticles. Firstly, shaped silica nanoparticles are treated with aminoalkyltrialkoxysilane as described above, to thereby prepare amino group-modified silica nanoparticles. Subsequently, the amino group-modified silica nanoparticles are treated with a dicarboxylic acid compound represented by formula (2):

[F3]

(wherein $R_3$ represents a C1 to C20 alkylene group or an aromatic group) or an acid anhydride thereof, to thereby prepare reactive functional group-bound silica nanoparticles wherein the reactive functional group has a carboxyl group at its terminal.

Examples of the compound represented by formula (2) include malonic acid, adipic acid, and terephthalic acid. The dicarboxylic acid compound is not limited to those represented by formula (2).

In the case of bonding the reactive functional group to the surfaces of silica nanoparticles through a three or more-step reaction, a monomer represented by the following formula (3) (i.e., a monomer having amino groups at both terminals)

[F4]

(wherein $R_4$ represents a C1 to C20 alkylene group or $(C_2H_5\text{—}O\text{—})_p$ and/or $(C_3H_7\text{—}O\text{—})_q$, and each of p and q is an integer of ≥1) is bound to silica nanoparticles which have been treated with a compound represented by formula (1) and then with a compound represented by formula (2), to thereby prepare surface-modified silica nanoparticles, wherein the surface modification group has an amino group at its terminal. This reaction is repeated.

Examples of the monomer represented by formula (3) include ethylenediamine, polyoxyethylenebisamine (molecular weight: 2,000), and 0,0'-bis(2-aminopropyl)polypropylene glycol-block-polyethylene glycol (molecular weight: 500).

A subsequent reaction may be carried out after changing the solvent of the thus-prepared first solvent dispersion of the reactive functional group-modified silica nanoparticles to a second solvent.

The second solvent has hydrophobicity higher than that of the first solvent. The second solvent is preferably at least one species selected from among tetrahydrofuran (THF), N-methylpyrrolidone (NMP), dimethylacetamide (DMAc), dimethylformamide (DMF), and γ-butyrolactone (GBL). The second solvent may be a solvent mixture.

No particular limitation is imposed on the method of substituting the first solvent by the second solvent. In one mode of substitution, a first solvent dispersion of the reactive functional group-modified silica nanoparticles is dried, and then the dry product is re-dispersed in the second solvent. In an alternative mode, a first solvent dispersion of the reactive functional group-modified silica nanoparticles is not dried and is directly subjected to solvent substitution.

After the above solvent substitution, the second solvent dispersion of the reactive functional group-modified silica nanoparticles is used. In the presence of the second solvent, a dendrimer or a hyperbranched polymer, having a multi-branched structure, is bound to the reactive functional group-modified silica nanoparticles. More specifically, a dendrimer-forming monomer or a hyperbranched polymer-forming monomer is reacted with the second solvent dispersion of the reactive functional group-modified silica nanoparticles, to thereby prepare silica nanoparticles to which the hyperbranched polymer or the dendrimer has been bound. Thus, a second solvent dispersion of the hyperbranched polymer- or dendrimer-bound silica nanoparticles is yielded.

The hyperbranched polymer-forming monomer used in the present invention is preferably a compound having one carboxyl group and two amino groups and represented by the following formula (4):

[F5]

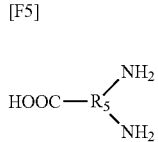

(4)

(wherein $R_5$ represents a C1 to C20 alkylene group or an aromatic group) or may be such a compound having 3 or more amino groups. $R_5$ may be a group other than the C1 to C20 alkylene group or the aromatic group. Examples of the hyperbranched polymer-forming monomer represented by formula (4) include 3,5-diaminobenzoic acid and 3,5-diamino-4-methylbenzoic acid.

Alternatively, the hyperbranched polymer-forming monomer used in the present invention may be a compound having one carboxyl group and two halogen atoms and represented by the following formula (5):

[F6]

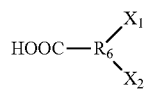

(5)

(wherein $R_6$ represents a C1 to C20 alkylene group or an aromatic group, and each of $X_1$ and $X_2$ represents a halogen atom).

Examples of the compound represented by formula (5) include 3,5-dibromo-4-methylbenzoic acid, 3,5-dibromo-salicylic acid, and 3,5-dibromo-4-hydroxy-benzoic acid.

The hyperbranched polymer-forming monomer is not limited to the aforementioned compound having one carboxyl group and two or more amino groups or having one carboxyl group and two or more halogen atoms. Any monomer capable of forming a hyperbranched polymer may be appropriately selected depending on the type of the reactive functional group of the modified silica nanoparticles.

In the case where the surfaces of silica nanoparticles are modified with a carboxyl group through a 2-step reaction, a hyperbranched polymer may be bound to the modified silica nanoparticles by use of a compound having one amino group and two carboxyl groups and represented by the following formula (6):

[F7]

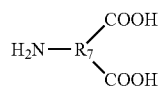

(6)

(wherein $R_7$ represents a C1 to C20 alkylene group or an aromatic group).

Examples of the compound represented by formula (6) include 2-aminoterephthalic acid, 4-aminoterephthalic acid, and DL-2-aminosuberic acid.

The hyperbranched polymer-forming monomer may be used as an additional monomer having one amino group and two or more halogen atoms and represented by the following formula (7):

[F8]

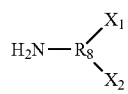

(7)

(wherein $R_8$ represents a C1 to C20 alkylene group or an aromatic group, and each of $X_1$ and $X_2$ represents a halogen atom).

Examples of the compound represented by formula (7) include 3,5-dibromo-4-methylaniline and 2,4-dibromo-6-nitroaniline.

In the case of using the silica nanoparticles having surfaces modified with a carboxyl group through the aforementioned 2-step reaction, similar to the case of using the silica nanoparticles having surfaces modified with an amino group through the aforementioned 1-step reaction, the compounds of the formulas (6) and (7) may have two or more carboxyl groups or two or more halogen atoms, and an additional monomer having a functional group (other than an amino group) capable of reacting with a carboxyl group may be used.

The single polymer chain of the hyperbranched polymer formed through the aforementioned reaction preferably has a weight average molecular weight of, for example, about 200 to about 2,000,000, and preferably has a branching degree of about 0.5 to about 1.

In the reaction, the hyperbranched monomer is dissolved in the second solvent (i.e., one or more solvents selected from among tetrahydrofuran (THF), N-methylpyrrolidone (NMP), dimethylacetamide (DMAc), dimethylformamide (DMF), and γ-butyrolactone (GBL)); subsequently benzotriazol-1-yloxytris(dimethylamino)phosphonium hexafluorophosphate (BOP) (i.e., a carboxylic acid activating reagent) and triethylamine (i.e., a nucleophilic reagent) are added to the solution, and the mixture is agitated. Then, the amino group-modified silica nanoparticles are added to the mixture, and the resultant mixture is agitated. The aforementioned combination of BOP and triethylamine may be replaced with another combination. For example, the carboxylic acid activating reagent may be triphenylphosphine, and the nucleophilic reagent may be pyridine.

Dendrimer-bound silica nanoparticles will next be described. Now will be described addition of a dendrimer to amino group-modified silica nanoparticles.

In the present invention, for addition of a dendrimer to amino group-modified silica nanoparticles of the present invention, a monomer represented by the following formula (8) (i.e., a monomer having three carboxyl groups) or a monomer having four or more carboxyl groups must be bound to the amino group-modified silica nanoparticles. Examples of the monomer used include trimesic acid and pyromellitic acid.

[F9]

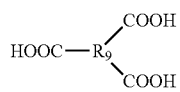

(8)

(in formula (8), $R_9$ represents a C1 to C20 alkylene group or an aromatic group)

The aforementioned addition of a monomer having three carboxyl groups or a monomer having four or more carboxyl groups is followed by addition of a monomer two amino groups at both terminals and represented by the following formula (3):

[F10]

$$H_2N-R_4-NH_2 \quad (3)$$

(wherein $R_4$ represents a C1 to C20 alkylene group or $(C_2H_5-O-)_p$ and/or $(C_3H_7-O-)_q$, and each of p and q is an integer of ≥1).

In the case of using the silica nanoparticles modified with a carboxyl group (i.e., a functional group) through the aforementioned 2-step reaction, the carboxyl group-modified silica nanoparticles are treated with a monomer having three amino groups and represented by the following formula (9):

[F11]

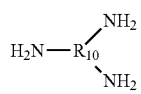

(9)

(wherein $R_{10}$ represents a C1 to C20 alkylene group or an aromatic group) or a monomer having four or more amino groups. Examples of the monomer represented by formula (9) include 1,2,5-pentanetriamine and 1,2,4,5-benzenetetraamine.

Subsequently, a monomer having two carboxyl groups at both terminals and represented by the following formula (10):

[F12]

$$HOOC-R_{11}-COOH \quad (10)$$

(wherein $R_{11}$ represents a C1 to C20 alkylene group, or $(C_2H_5-O-)_p$ and/or $(C_3H_7-O-)_q$, and each of p and q is an integer of ≥1) is bound to the resultant silica nanoparticles. Examples of the monomer include succinic acid, levulinic acid, and O,O'-bis[2-(succinylamino)ethyl]polyethylene glycol (molecular weight: 2,000).

This addition is repeated to thereby prepare silica nanoparticles having surfaces modified with a dendrimer. The dendrimer-forming monomer may have a group other than an amino group or a carboxyl group.

The thus-prepared second solvent dispersion of hyperbranched polymer- or dendrimer-bound, surface-modified silica nanoparticles are mixed with a matrix resin. Finally, the mixture is formed into a membrane. Notably, before mixing of the hyperbranched polymer- or dendrimer-bound silica nanoparticles with a matrix resin, the silica nanoparticles may be dried. Alternatively, at least a portion of the second solvent may be replaced with another second solvent or a solvent other than the second solvent.

In the present invention, the matrix resin for producing the master batch may be, for example, any conventional resin known to form a gas separation membrane. Specific examples include, but are not limited to, polyimide, polysulfone, dimethylsilicone, poly(vinyl alcohol), poly(substituted acetylene), poly-4-methylpentene, natural rubber, and a microporous polymer. In present invention, a microporous polymer, dimethylsilicone, and poly(vinyl alcohol) are preferred, with microporous polymers being particularly preferred.

The microporous polymer is a polymer of intrinsic microporosity, which is a microporous organic material. Polymers of intrinsic microporosity are a unique class of microporous organic material. The class of microporous material is referred in the following documents:

(Document 1) Budd, P. M. et al., Solution-Processed, Organophilic Membrane Derived from a Polymer of Intrinsic Microporosity. Adv. Mater. 16, 456-459 (2004).

(Document 2) McKeown, N. B. et al., Polymers of intrinsic microporosity (PIMs): Bridging the void between microporous and polymeric materials. Chemistry—A European Journal 11, 2610-2620 (2005).

(Document 3) Budd, P. M. et al., Gas separation membranes from polymers of intrinsic microporosity. J. Membr. Sci. 251, 263-269 (2005).

(Document 4) McKeown, N. B. & Budd, P. M., Polymers of intrinsic microporosity (PIMs): Organic materials for membrane separations, heterogeneous catalysis and hydrogen storage. Chem. Soc. Rev. 35, 675-683 (2006).

(Document 5) Du, N. et al., Polymer nanosieve membranes for CO2-capture applications. Nat. Mater. 10, 372-375 (2011).

(Document 6) Carta, M. et al., An Efficient Polymer Molecular Sieve for Membrane Gas Separations. Science 339, 303-307 (2013).

(Document 7) Japanese Translation of PCT International Application Publication No. 2017-509744.

The concept of "polymers of intrinsic microporosity (PIMs)" was first developed by Budd and McKeown in 2002. International patent application WO 2003000774 A1 discloses an organic microporous network material including a rigid 3-dimensional network of planar porphyrinic macrocycles. In the network, pyrrole residues of adjacent macrocycles are connected by rigid linkers which restrain these adjacent macrocycles. As a result, the porphyrinic planes are in a non-coplanar orientation. In the invention of Budd and McKeown, a phthalocyanine network is a preferred material. Such organic microporous materials are known as network PIMs.

As another invention of Budd and McKeown, International application WO 2005012397A2 and U.S. Pat. No. 7,690,514 B2 disclose microporous organic macromolecules including first generally planar species connected by rigid linkers having a point of contortion such that two adjacent first species connected by the linker are held in non-coplanar orientation, provided that the first species are other than porphyrinic macromolecules.

Among such microporous polymers, particularly preferred is PIM-1 represented by the following structure.

[F13]

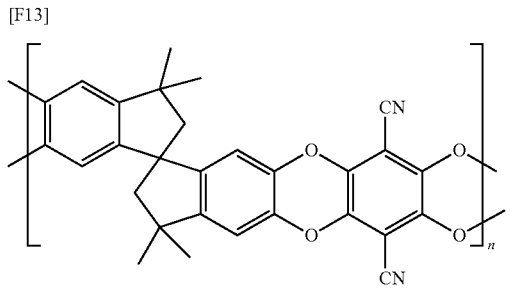

When PIM-1 is used as a matrix resin, the ratio by mass of the resin to fine particles is, for example, 99/1 to 20/80, preferably 95/5 to 40/60, more preferably 90/10 to 50/50.

No particular limitation is imposed on the solvent used in production of master batch, so long as the solvent can dissolve the target polymer and has compatibility with the solvent in which the fine particles are to be dispersed. Examples of the solvent include tetrahydrofuran (THF), chloroform, dimethylacetamide (DMAc), toluene, C1 to C6 linear-chain alcohols, C1 to C6 branched-chain alcohols, hexane, heptane, octane, decane, N-methyl-2-pyrrolidone (NMP), and N,N-dimethylformamide (DMF). These solvents may be used singly or in combination of two or more species.

When PIM-1 and THF are used as the matrix resin and the solvent, the ratio by mass of resin to solvent is, for example, 1/99 to 30/70, preferably 3/97 to 30/70, more preferably 5/95 to 20/80.

In the case where another resin is used as the matrix resin, the amount of the fine particles to the entire mass of the master batch is adjusted to 1 mass % to 70 mass %, preferably 1 mass % to 50 mass %.

In one mode of the gas separation membrane production method, the master batch is uniformly dispersed in an appropriate solvent, for example, a solvent mixture of one or more species selected from among THF, chloroform, toluene, a C1 to C6 linear-chain alcohol, a C1 to C6 branched-chain alcohol, hexane, heptane, octane, decane, DMAc, NMP, and DMF. After application of the mixture onto a substrate, the solvent is evaporated. No particular limitation is imposed on the substrate to which the mixture is applied, a substrate of any material or surface state may be used, so long as the substrate is not deteriorated by the solvent. For example, a silicon wafer, having no surface irregularities, may be employed.

The application method is preferably a method which can attain uniform coating on a substrate. Examples of such methods include dip coating (immersion), spin coating, blade coating, and spray coating. Particularly, a doctor blade coating is preferably employed.

The present invention will next be described in detail by way of example, which should not be construed as limiting the invention thereto.

EXAMPLES

<Synthesis of Surface-Modified Silica ST-G1>

To a four-neck, round-bottom flask (1,000 mL) equipped with a condenser, a thermometer, and an agitator, there were added a silica dispersion in isopropanol (IPA) (IPA-ST, product of Nissan Chemical Corporation, silica concentration: 30.5 mass %, mean primary particle size: 12 nm) (133.44 g), ultrapure water (0.19 g), and IPA (533.9 g), and the mixture was heated to reflux under agitation. Thereafter, APTES (product of Tokyo Chemical Industry Co., Ltd.) (2.35 g) was added thereto, and the resultant mixture was agitated for 1 hour under reflux, to thereby prepare a dispersion. The solvent of the dispersion was changed to 1-methyl-2-pyrrolidone (NMP).

To a four-neck, round-bottom flask (1,000 mL) equipped with a condenser, a thermometer, and an agitator, there were added the thus-obtained dispersion in NMP (440 g, solid content: 37.4 g), 1,3-diaminobenzoic acid (DABA) (product of Aldrich) (4.85 g), triethylamine (TEA) (product of Kanto Chemical Co., Inc.) (3.30 g), and benzotriazol-1-yloxytris(dimethylamino)phosphonium hexafluorophosphate (BOP) (product of Tokyo Chemical Industry Co., Ltd.) (14.1 g), and the mixture was agitated at room temperature for 5 minutes. The mixture was heated at 80° C. and was allowed to react for 1 hour. The reaction was added to a 10-fold volume of methanol, and precipitates were separated through filtration and washed with methanol. The filtration product was not dried and was added to NMP, and the mixture was agitated. Thereafter, remaining methanol and water were vaporized out by means of an evaporator, to thereby yield surface-modified silica ST-G1_dispersion in NMP. The dispersion in NMP was found to have a solid (particles) content of 11.04 mass %.

<Production of Master Batch 1>

To the surface-modified silica ST-G1 dispersion in NMP (9.058 g, solid content: 11.04 mass %), THF (19.00 g) and NMP (10.942 g) were added, and the mixture was agitated. Thereafter, PIM-1 (molecular weight distribution: 16, Mw: 225,000) (1 g) was added thereto, and the mixture was vigorously agitated until the resin was dissolved at room temperature. Subsequently, the mixture was irradiated with ultrasonic waves for about 5 minutes. The thus-formed dispersion was filtered through a filter having a pore size of 5 μm, and the residue was precipitated in methanol. The resultant mixture was filtered, and the residue was washed with methanol and dried at 110° C. under reduced pressure, to thereby yield a 50-mass % master batch (MB) 1.

Example 1

The 50-mass % MB1 (0.200 g) was added to THF (1.8 g) such that the total solid content and ST-G1 content (vs.

PIM-1) were adjusted to 10 mass % and 50 mass %, respectively. The mixture was vigorously agitated. After dissolution of the resin, the mixture was irradiated with ultrasonic waves for about 5 minutes, to thereby prepare a varnish. The varnish was applied onto an Si wafer by means of a doctor blade having a GAP of 100 μm and dried under THF, to thereby form a composite membrane. A cross-section of the membrane was observed under an SEM so as to evaluate the dispersion state of the particles. FIG. 1 shows the results of SEM cross-section observation. The dispersion stability of the varnish, membrane formability, and particle dispersibility were evaluated on the basis of the following ratings. Table 1 shows the results.

Dispersibility of Varnish

As-prepared varnish was allowed to stand for about 5 minutes, and particle sedimentation was visually checked.
No substantial sedimentation: ○
Sedimentation: X Membrane Formability
No warpage or breakage, membrane formable: ○
Warpage and breakage, membrane not formable: X Particle Dispersibility
No sedimentation observed in the membrane, size of particle aggregate <1 μm: ○
Sedimentation observed in the membrane, size of particle aggregate ≥1 μm: X Example 2

Figure 2:
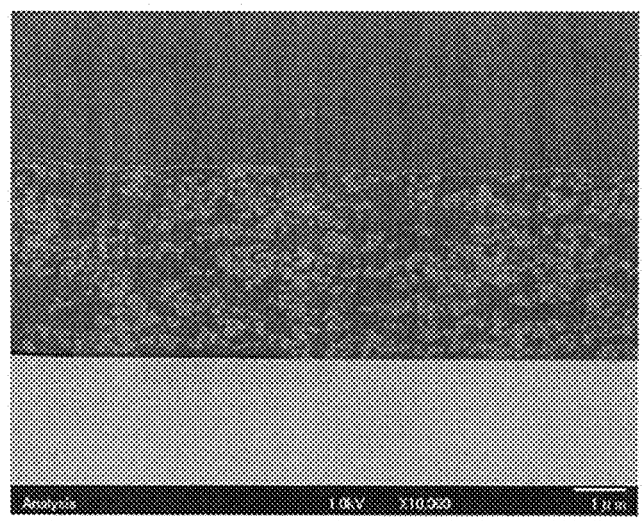
FIG. 2 An SEM image of a cross-section of a membrane according to Example 2.

The same procedure was performed, except that the amounts of 50-mass % MB1 and PIM-1 were modified so as to adjust the ST-G1 content (vs. PIM-1) to 30 mass %. FIG. 2 shows the results of SEM cross-section observation. The dispersion stability of the varnish, membrane formability, and particle dispersibility were evaluated on the basis of the following ratings. Table 1 shows the results.

Example 3

Figure 3:
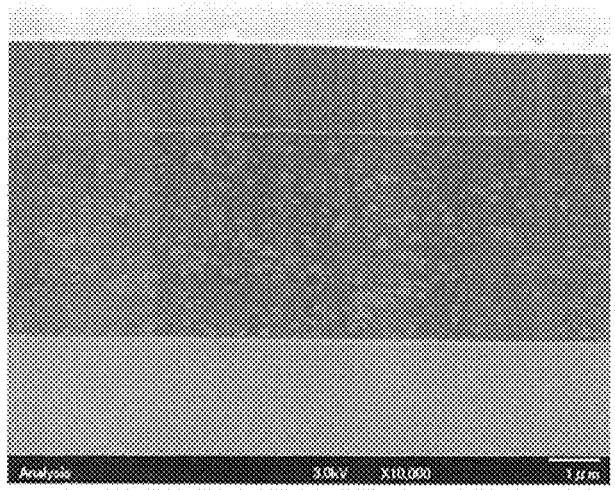
FIG. 3 An SEM image of a cross-section of a membrane according to Example 3.

The same procedure was performed, except that the amounts of 50-mass % MB1 and PIM-1 were modified so as to adjust the ST-G1 content (vs. PIM-1) to 10 mass %. FIG. 3 shows the results of SEM cross-section observation. The dispersion stability of the varnish, membrane formability, and particle dispersibility were evaluated on the basis of the following ratings. Table 1 shows the results.

Comparative Example 1

ST-G1_dispersion in NMP was dried at 110° C. under reduced pressure, and the dried powder was pulverized by means of a mortar. The pulverization product was added to THF such that the total solid content (the powder+PIM-1) and the ST-G1 content (vs. PIM-1) were adjusted to 10 mass % and 10 mass %, respectively, and the mixture was agitated at room temperature. After dissolution of the resin, the mixture was irradiated with ultrasonic waves for about 5 minutes. The thus-obtained varnish was evaluated through the same procedure as employed in Example 1.

TABLE 1

| | Dispersion stability of varnish | Membrane formability | Particle dispersibility |
|---|---|---|---|
| Example 1 | ○ | ○ | ○ |
| Example 2 | ○ | ○ | ○ |

TABLE 1-continued

| | Dispersion stability of varnish | Membrane formability | Particle dispersibility |
|---|---|---|---|
| Example 3 | ○ | ○ | ○ |
| Comp. Ex. 1 | X | X | X |

As is clear from FIGS. 1 to 3 and Table 1, MB1 prepared from silica nanoparticles and PIM-1 serving as a matrix resin provided a varnish having excellent dispersion stability, and the dispersibility of ST-G1 in the resin was satisfactory. The varnish exhibited excellent membrane formability without causing warpage, breakage, or the like of the membrane.

In contrast, in Comparative Example 1, in which the dry powder was used without preparing master batch (MB), the dispersion stability of the varnish was unsatisfactory. The varnish encountered difficulty in membrane formation by means of a doctor blade, and breakage was observed in the formed membrane.

<Production of Master Batch 2>

Dimethylsilicone (KS-707, product of Shin-Etsu Chemical Co., Ltd.) (9.14 g) was added to the surface-modified silica ST-G1 dispersion in methanol (18.37 g, solid content: 4.45 mass %), and the mixture was dried under reduced pressure by means of a rotary evaporator. Subsequently, the dry product was further dried at 60° C. under vacuum, to thereby yield a 15-mass % master batch (MB) 2.

Example 11

Figure 4:
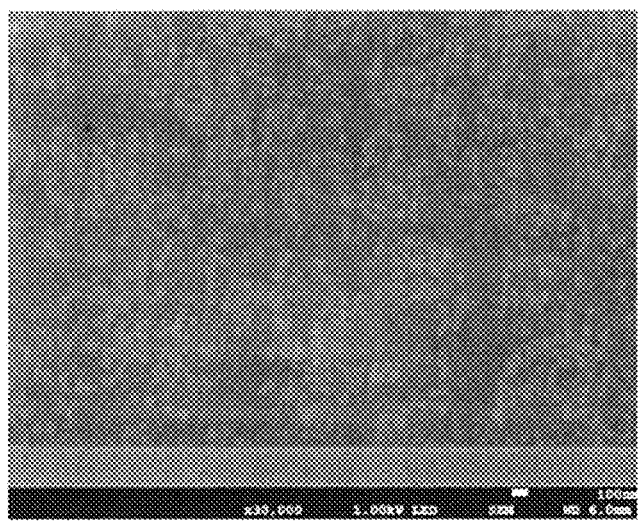
FIG. 4 An SEM image of a cross-section of a membrane according to Example 11.

The 15-mass % MB2 (0.291 g) was added to hexane (2.9 g) such that the total solid content and ST-G1 content (vs. dimethylsilicone) were adjusted to 10 mass % and 15 mass %, respectively. The mixture was vigorously agitated. After dissolution of the resin, the mixture was irradiated with ultrasonic waves for about 5 minutes, to thereby prepare a varnish. The varnish was applied onto a glass substrate by means of a spin coater (rotation speed: 500 rpm/25 s) and dried at 150° C., to thereby form a composite membrane. A cross-section of the membrane was observed under an SEM so as to evaluate the dispersion state of the particles. FIG. 4 shows the results of SEM cross-section observation. The dispersion stability of the varnish and membrane formability were evaluated on the basis of the following ratings. Table 2 shows the results.

Dispersibility of Varnish
As-prepared varnish was allowed to stand for about 40 minutes, and particle sedimentation was visually checked.
No substantial sedimentation: ○
Sedimentation: X Membrane Formability
membrane uniformly spread on the surface, membrane formable: ○
membrane non-uniformly spread on the surface, membrane not formable: X Particle Dispersibility
No sedimentation observed in the membrane, size of particle aggregate <1 μm: ○
Sedimentation observed in the membrane, size of particle aggregate ≥1 μm: X Example 12

The same procedure was performed, except that 15 mass % MB2 (0.121 g) was dissolved in heptane (0.995 g) so as to adjust the ST-G1 content (vs. dimethylsilicone) to 15 mass %. The dispersion stability of the varnish, membrane formability, and particle dispersibility were evaluated on the basis of the following ratings. Table 2 shows the results.

Example 13

The same procedure was performed, except that 15 mass % MB2 (0.116 g) was dissolved in octane (0.984 g) so as to adjust the ST-G1 content (vs. dimethylsilicone) to 15 mass %. The dispersion stability of the varnish, membrane formability, and particle dispersibility were evaluated on the basis of the following ratings. Table 2 shows the results.

Example 14

The same procedure was performed, except that 15 mass % MB2 (0.126 g) was dissolved in decane (1.050 g) so as to adjust the ST-G1 content (vs. dimethylsilicone) to 15 mass %. The dispersion stability of the varnish, membrane formability, and particle dispersibility were evaluated on the basis of the following ratings. Table 2 shows the results.

Comparative Example 11

ST-G1_dispersion in methanol was dried at 60° C. under reduced pressure, and the dried powder was pulverized by means of a mortar. The pulverization product was added to hexane such that the total solid content (the powder+dimethylsilicone) and the ST-G1 content (vs. dimethylsilicone) were adjusted to 10 mass % and 15 mass %, respectively, and the mixture was agitated at room temperature. After dissolution of the resin, the mixture was irradiated with ultrasonic waves for about 5 minutes. The thus-obtained varnish was evaluated through the same procedure as employed in Example 1.

TABLE 2

|  | Dispersion stability of varnish | Membrane formability | Particle dispersibility |
| --- | --- | --- | --- |
| Example 11 | ◯ | ◯ | ◯ |
| Example 12 | ◯ | ◯ | ◯ |
| Example 13 | ◯ | ◯ | ◯ |
| Example 14 | ◯ | ◯ | ◯ |
| Comp. Ex. 11 | X | X | X |

As is clear from FIG. 4 and Table 2, MB2 prepared from silica nanoparticles and dimethylsilicone serving as a matrix resin provided a varnish having excellent dispersion stability, and the dispersibility of ST-G1 in the resin was satisfactory. The varnish exhibited excellent membrane formability without causing warpage, breakage, or the like of the membrane.

In contrast, in Comparative Example 11, in which the dry powder was used without preparing master batch (MB2), the dispersion stability of the varnish was unsatisfactory. The varnish encountered difficulty in membrane formation by means of a doctor blade, and breakage was observed in the formed membrane.

<Production of Master Batch 3>

Dimethylsilicone (YSR3022, product of Momentive) (29.3 g) was added to the surface-modified silica ST-G1 dispersion in methanol (28.4 g, solid content: 4.45 mass %), and the mixture was dried under reduced pressure by means of a rotary evaporator. Subsequently, octane was added to the dry product, and the resultant mixture was further dried under reduced pressure, to thereby yield a 15-mass % master batch (MB) 3.

Example 15

Figure 5:
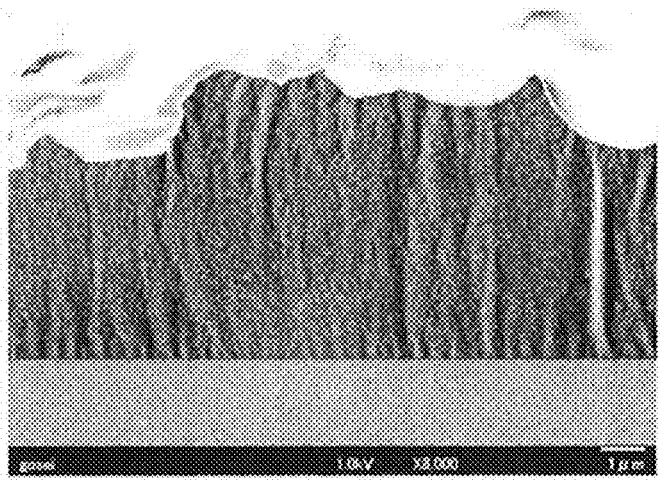
FIG. 5 An SEM image of a cross-section of a membrane according to Example 15.

The 15-mass % MB3 (4.63 g) was added to octane (2.9 g) such that the total solid content and ST-G1 content (vs. dimethylsilicone) were adjusted to 10 mass % and 15 mass %, respectively, and the mixture was agitated, to thereby prepare a varnish. The varnish was applied onto a glass substrate by means of a spin coater (rotation speed: 500 rpm/25 s) and dried at 150° C., to thereby form a composite membrane. A cross-section of the membrane was observed under an SEM so as to evaluate the dispersion state of the particles. FIG. 5 shows the results of SEM cross-section observation. The dispersion stability of the varnish and membrane formability were evaluated on the basis of the following ratings. Table 3 shows the results.

Dispersibility of Varnish

As-prepared varnish was allowed to stand for about 40 minutes, and particle sedimentation was visually checked.

No substantial sedimentation: ◯

Sedimentation: X

Membrane Formability membrane uniformly spread on the surface, membrane formable: ◯ membrane non-uniformly spread on the surface, membrane not formable: X

Particle Dispersibility

No sedimentation observed in the membrane, size of particle aggregate <1 μm: ◯

Sedimentation observed in the membrane, size of particle aggregate ≥1 μm: X

Example 16

The same procedure was performed, except that 15 mass % MB3 (2.381 g) was dissolved in heptane (3.900 g) so as to adjust the ST-G1 content (vs. dimethylsilicone) to 15 mass %. The dispersion stability of the varnish, membrane formability, and particle dispersibility were evaluated on the basis of the following ratings. Table 3 shows the results.

Comparative Example 12

ST-G1 dispersion in methanol was dried at 65° C. under reduced pressure, and the dried powder was pulverized by means of a mortar. The pulverization product was added to hexane such that the total solid content (the powder+dimethylsilicone) and the ST-G1 content (vs. dimethylsilicone) were adjusted to 10 mass % and 15 mass %, respectively, and the mixture was agitated at room temperature. After dissolution of the resin, the mixture was irradiated with ultrasonic waves for about 5 minutes. The thus-obtained varnish was evaluated through the same procedure as employed in Example 15.

TABLE 3

|  | Dispersion stability of varnish | Membrane formability | Particle dispersibility |
| --- | --- | --- | --- |
| Example 15 | ◯ | ◯ | ◯ |
| Example 16 | ◯ | ◯ | ◯ |
| Comp. Ex. 12 | X | X | X |

As is clear from FIG. 5 and Table 3, MB3 prepared from silica microparticles and dimethylsilicone serving as a matrix resin provided a varnish having excellent dispersion stability, and the dispersibility of ST-G1 in the resin was satisfactory. The varnish exhibited excellent film formability without causing warpage, breakage, or the like of the membrane.

In contrast, in Comparative Example 12, in which the dry powder was used with no master batch (MB3), the dispersion stability of the varnish was unsatisfactory. The varnish encountered difficulty in film formation by means of a doctor blade, and breakage was observed in the formed membrane.

<Production of Master Batch 4>

Poly(vinyl alcohol) (Gohsenx LL-940, product of Mitsubishi Chemical Co., Ltd.) was dissolved in 50 mass % aqueous methanol, to thereby prepare a solution having a solid content of 9.12%. Then, surface-modified silica ST-G1 methanol sol (16.47 g) (solid content: 3.78 mass %) was added to a solution (15.98 g) of poly(vinyl alcohol), and the resultant mixture was dried under reduced pressure by means of a rotary evaporator, to thereby yield a 30-mass % master batch (MB) 4.

Example 21

The 30-mass % MB4 (1.79 g) was added to glycerol (0.17 g) such that the total solid content and ST-G1 content of poly(vinyl alcohol) were adjusted to 6.41 mass % and 30 mass %, respectively, and the mixture was agitated, to thereby prepare a varnish. The varnish was applied onto a Petri dish, and the dispersion stability of the varnish and film formability were evaluated on the basis of the following ratings. Table 4 shows the results.

Dispersibility of Varnish

As-prepared varnish was allowed to stand for about 30 minutes, and particle sedimentation was visually checked.
No substantial sedimentation: ○
Sedimentation: X Film Formability
Film uniformly spread on the surface, film formable: ○
Film non-uniformly spread on the surface, Membrane film not formable: X Example 22

The 30-mass % MB4 (7.30 g) was diluted with a solution thereof with aqueous poly(vinyl alcohol) dissolved in 50% aqueous methanol, so as to adjust the ST-G1 content (vs. poly(vinyl alcohol)) to 15 mass %, to thereby prepare a 15-mass % master batch (MB) 5. The 15-mass % MB5 (3.21 g) was added to glycerol (0.24 g), and the mixture was agitated, to thereby prepare a varnish. The same procedure followed. The dispersion stability of the varnish, film formability, and particle dispersibility were evaluated on the basis of the following ratings. Table 4 shows the results.

Comparative Example 21

ST-G1 methanol sol was dried at 65° C. under reduced pressure, and the dried powder was pulverized by means of a mortar. The pulverization product was added to 50-mass % aqueous methanol such that the total solid content (the powder+poly(vinyl alcohol)) and the ST-G1 content (vs. poly(vinyl alcohol)) were adjusted to 10 mass % and 15 mass %, respectively, and the mixture was agitated at room temperature. After dissolution of the resin, the mixture was irradiated with ultrasonic waves for about 5 minutes. The thus-obtained varnish was evaluated through the same procedure as employed in Example 21.

TABLE 4

|  | Dispersion stability of varnish | Film formability | Particle dispersibility |
| --- | --- | --- | --- |
| Example 21 | ○ | ○ | ○ |
| Example 22 | ○ | ○ | ○ |
| Comp. Ex. 21 | X | X | X |

As is clear from Table 4, MB4 or MB5 prepared from silica microparticles and dimethylsilicone serving as a matrix resin provided a varnish having excellent dispersion stability, and the dispersibility of ST-G1 in the resin was satisfactory. The varnish exhibited excellent film formability without causing warpage, breakage, or the like of the membrane.

In contrast, in Comparative Example 21, in which the dry powder was used with no master batch (MB4 or MB5), the dispersion stability of the varnish was unsatisfactory. The varnish encountered difficulty in film formation by means of a doctor blade, and breakage was observed in the formed membrane.

The invention claimed is:

1. A method for producing a gas separation membrane containing fine particles having a mean primary particle size of 1 nm to 1,000 nm uniformly dispersed in a resin, the method comprising the following (A) and (B):
   (A) mixing the fine particles with a matrix resin and a first solvent to form a mixture, the amount of the fine particles with respect to the entire mass of the mixture being adjusted to 1 mass % to 50 mass %, and subsequently drying the mixture to remove the first solvent, to thereby prepare a master batch; and
   (B) dissolving the master batch in a second solvent to prepare a solution, subsequently applying the solution onto a substrate, and subsequently evaporating the second solvent,
   wherein the matrix resin is a microporous polymer, dimethylsilicone or poly(vinyl alcohol).

2. The gas separation membrane production method according to claim 1, wherein the matrix resin is a microporous polymer.

3. The gas separation membrane production method according to claim 2, wherein the microporous polymer is a polymer (PIM-1) represented by the following structure:

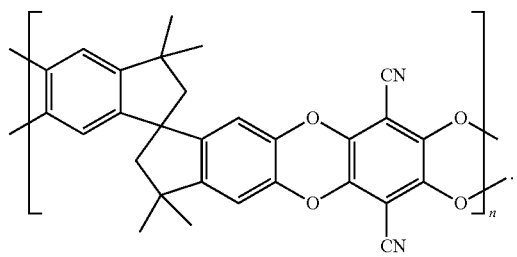

4. The gas separation membrane production method according to claim 1, wherein the matrix resin is dimethylsilicone.

5. The gas separation membrane production method according to claim 1, wherein the matrix resin is poly(vinyl alcohol).

6. The gas separation membrane production method according to claim 1, wherein the fine particles are inorganic fine particles.

7. The gas separation membrane production method according to claim 1, wherein the fine particles are silica fine particles.

8. The gas separation membrane production method according to claim 7, wherein the silica fine particles are silica fine particles modified with a functional group.

* * * * *